United States Patent [19]

Green et al.

[11] Patent Number: 4,962,075
[45] Date of Patent: Oct. 9, 1990

[54] ZEOLITIC COPPER CATALYST

[75] Inventors: Gary J. Green, Yardley, Pa.; David S. Shihabi, Pennington, N.J.

[73] Assignee: Mobil Oil Corp., New York, N.Y.

[21] Appl. No.: 279,613

[22] Filed: Dec. 5, 1988

[51] Int. Cl.$^5$ .................. B01J 29/30; B01J 29/20; B01J 29/10

[52] U.S. Cl. ........................ 502/71; 502/64; 502/77

[58] Field of Search ............ 502/71, 77, 64; 423/239

[56] References Cited

U.S. PATENT DOCUMENTS

| | | | |
|---|---|---|---|
| 3,013,985 | 12/1961 | Breck et al. | 252/455 |
| 3,346,328 | 10/1967 | Sergeys et al. | 23/2 |
| 3,565,574 | 2/1971 | Kearby et al. | 423/239 |
| 3,835,068 | 9/1974 | West | 502/77 |
| 3,900,554 | 8/1975 | Lyon | 423/235 |
| 4,010,238 | 3/1977 | Shiraishi et al. | 423/239 |
| 4,046,088 | 9/1977 | Asel et al. | 112/265 |
| 4,170,571 | 10/1979 | Ritscher | 252/455 Z |
| 4,220,632 | 9/1980 | Pence et al. | 423/239 |
| 4,297,328 | 10/1981 | Ritscher et al. | 423/213.2 |
| 4,358,397 | 11/1982 | Chu | 502/77 |
| 4,465,889 | 8/1984 | Anthony et al. | 502/71 |
| 4,564,604 | 1/1986 | Iida et al. | 423/239 |
| 4,608,355 | 8/1986 | Chu | 502/71 |
| 4,798,813 | 1/1989 | Kato et al. | 502/60 |

*Primary Examiner*—Carl F. Dees
*Attorney, Agent, or Firm*—Alexander J. McKillop; Charles J. Speciale; Dennis P. Santini

[57] ABSTRACT

Improved zeolitic copper catalysts are prepared by incorporating with the catalyst a steam-stabilizing amount of titanium or zirconium compound. The novel compositions are particularly useful in treating wet exhaust gases to reduce the content of one or more pollutants such as nitrogen oxides, carbon monoxide and hydrocarbons.

14 Claims, 1 Drawing Sheet

ZEOLITIC COPPER CATALYST

FIELD OF THE INVENTION

This invention is concerned with zeolitic copper catalysts that are formed, for example, by ion-exchanging the sodium form of ZSM-5 zeolite with divalent copper cations. More particularly, this invention is concerned with an improved catalyst composition that is very resistant to loss of catalytic activity when the composition is exposed to steam at high temperature.

BACKGROUND OF THE INVENTION

Atmospheric pollution is a societal problem which is receiving much attention. The major source of such pollution is the extensive use of fossil fuels, although industrial and chemical processes, such as the manufacture of nitric acid, also contribute. The principal pollutants are nitrogen oxides, carbon monoxide, and perhaps to a lesser extent hydrocarbons, sulfur oxides and other objectionable gases and vapors.

Although several nitrogen oxides are known which are relatively stable at ambient conditions, it is generally recognized that two of these, viz. nitric oxide (NO) and nitrogen dioxide ($NO_2$), are the principle contributors to smog and other undesirable environmental effects when they are discharged into the atmosphere. These effects will not be discussed further herein since they are well recognized and have led various government authorities to restrict industrial and automotive emissions in an attempt to limit the level of the oxides in the atmosphere. Nitric oxide and nitrogen dioxide, under appropriate conditions, are interconvertible according to the equation:

$$2NO + O_2 = 2NO_2.$$

For purposes of the present invention, $NO_x$ will be used herein to represent nitric oxide, nitrogen dioxide, and mixtures thereof Formation of nitrogen oxides from the elements occurs in the high temperature zones of combustion processes. The internal combustion engine, and coal or gas-fired furnaces, boilers and incinerators, all contribute to $NO_x$ emissions. In general, fuel-rich combustion mixtures produce exhaust gases with lower contents of $NO_x$ than do lean mixtures. Although the concentrations of $NO_x$ in the exhaust gases produced by combustion usually are low, the aggregate amounts discharged in industrial and/or highly populated areas is adequate to cause problems. Other industrial sources of pollution also exist. These are associated with the manufacture of nitric acid, with nitration of organic chemicals, and with other chemical operations, such as the reprocessing of spent nuclear fuel rods by dissolution in nitric acid to recover uranyl nitrate followed by calcination to convert the nitrate to uranium oxide. In these instances the exhaust gas may contain relatively high levels of $NO_x$, such as from 0.1% up to 2% to 3%.

The so-called "stable" nitrogen oxides have in common the somewhat peculiar property that although they are thermodynamically extremely unstable at room temperature with respect to decomposition into elemental oxygen and nitrogen, no simple, economical method has been described for inducing this decomposition. It has been discovered, however, that adding a reductant such as ammonia to the exhaust gas can, under appropriate reaction conditions, convert $NO_x$ to elemental nitrogen and steam at moderate temperatures in the range of 200° to 600° C.

Unlike the objectionable nitrogen oxides, carbon monoxide is a combustible gas which is convertible to $CO_2$ by burning. Also unlike the nitrogen oxides, for which relatively few effective conversion catalysts are known, the combustion of carbon monoxide is catalyzed by a fairly large number of catalysts among which are the platinum group metals and their alloys, gold, base metal oxides such as chromia and copper oxide, and certain rare earth oxides.

The technology for abatement of pollution by noxious gases began to be developed some years ago. The earliest methods for control of gaseous emissions included absorption, adsorption, condensation, chemical reaction and incineration. Some of these methods, such as absorption, require the disposal of recovered pollutants, which in itself may be a problem.

In recent years, increasing attention has been paid to developing catalytic technology for control of exhaust gas pollution. Such technology potentially offer the advantages of low cost and the possibility for converting the noxious gas to one or more innocuous substances such as carbon dioxide and water, which are free of disposal problems. In instances in which two or more substances such as $NO_x$ and CO are present in the exhaust, as is often the case with fossil fuel combustion, a single catalyst that is effective for converting more than one of the pollutants is highly desirable.

Certain zeolitic catalysts have been described as effective for control of pollution by one or more of $NO_x$, CO, and hydrocarbons. The term "zeolite" or "zeolitic" as used herein refers to porous crystalline minerals or synthetic oxides, usually aluminosilicates, that have a rigid three dimensional framework structure, such as are described in "Zeolite Molecular Sieves" by Donald W. Breck, John Wiley & Sons, New York, N.Y. (1974), relevant portions of which are incorporated herein by reference for background.

U.S. Pat. No. 3,900,554 to Lyon describes a non-catalyzed homogeneous gas phase reaction to remove $NO_x$ from combustion effluent by adding 0.4 to 10 moles (preferably 0.5 to 1.5 moles) of ammonia followed by heating to 1600° C. to 2000° C. The $NO_x$ content is lowered as a result of its being reduced to nitrogen by reaction with ammonia. The method is reported to work best if hydrocarbon is also added to the mixture. The extremely high temperature required for $NO_x$ abatement is a disadvantage of the method.

U.S. Pat. No. 4,220,632 to Pence et al. discloses a process for reducing noxious nitrogen oxides from a fossil-fuel-fired power generation plant, or from other industrial plant off-gas stream, to elemental nitrogen and/or innocuous nitrogen oxides employing ammonia as reductant and, as catalyst, the hydrogen or sodium form of a zeolite having pore openings of about 3 to 10 Angstroms. The Pence et al. patent illustrates the so-called Selective Catalytic Reduction Process (hereinafter referred to as the "SCR Process") for removal of $NO_x$ from exhaust gas. While the SCR process usually operates at 200°–600° C., which is an advantage over the uncatalyzed conversion, an external reductant (ammonia) must be furnished which adds to the cost of the process, and control of the $NH_3$ feed is required to avoid ammonia emissions.

During early commercial development of molecular sieves, it was found that copper, for example, could be introduced into the inner absorption regions of the crystalline zeolites by several different means, including simple ion-exchange with divalent copper ion, and impregnation with complexes such as copper acetylacetonate in which the metal is in the zero valence state. It was further found that copper, in the inner absorption regions of the zeolite, whether present as metal or cation, reacted readily with molecules that could enter the pores of the molecular sieve. U.S. Pat. No. 3,013,985 to Breck et al. is incorporated herein by reference for background purposes, and also for the description contained therein on methods for loading the molecular sieve with copper either by ion-exchange or by the use of complex decomposable compounds in which the metal is in the zero valence state.

The use of copper exchanged zeolites in the SCR reduction of $NO_x$ is mentioned in U.S. Pat. No. 4,046,088.

U.S. Pat. No. 3,346,328 to Sergeys et al. proposes to use as the catalyst for treating internal combustion engine exhaust gases a $Cu^{++}$ exchanged zeolite such as Zeolite Y which has CuO loaded or held interstitially in its pore system. Since the copper ion is reported to play an important part in hydrocarbon conversion and copper oxide is reported to be an influential factor in carbon monoxide conversion, the activity of the catalyst is optimized for a particular exhaust gas by varying the proportion of zeolitic $Cu^{++}$ cations and impregnated CuO.

In catalytic pollution control technology, the monetary cost is significant, and particularly so when the exhaust contains little or no economically recoverable values in terms of materials or heat. For this reason, it becomes very important to find catalysts that are relatively inexpensive, and that are not only effective for the desired conversion, but that also are adequately long lived in the process environment. As a general rule, a catalyst will deteriorate with time on stream for one or more reasons, such as loss of activity for conversion, for selectivity, or for both, until it becomes necessary to discard it. The term "aging", as used herein, will refer to such deterioration. One of the factors often responsible for excessive aging is exposure of the catalyst to steam at high temperature. Unfortunately, the burning of fossil fuels inherently forms a flue gas or exhaust gas that contains a significant content of steam as well as $NO_x$ and/or other pollutants such as CO and hydrocarbons. Catalytic removal of such pollutants necessarily include contact with steam.

It is an object of this invention to provide a steam-resistant zeolite copper catalyst for the catalytic decomposition of $NO_x$. It is a further object of this invention to provide a method for preparing a steam-resistant zeolitic copper catalyst. These and other objects will become evident on reading this entire specification including the appended claims.

We now have found a surprising, simple way to make zeolitic copper catalysts that are highly resistant to aging in the presence of steam.

SUMMARY OF THE INVENTION

Figure 1A:
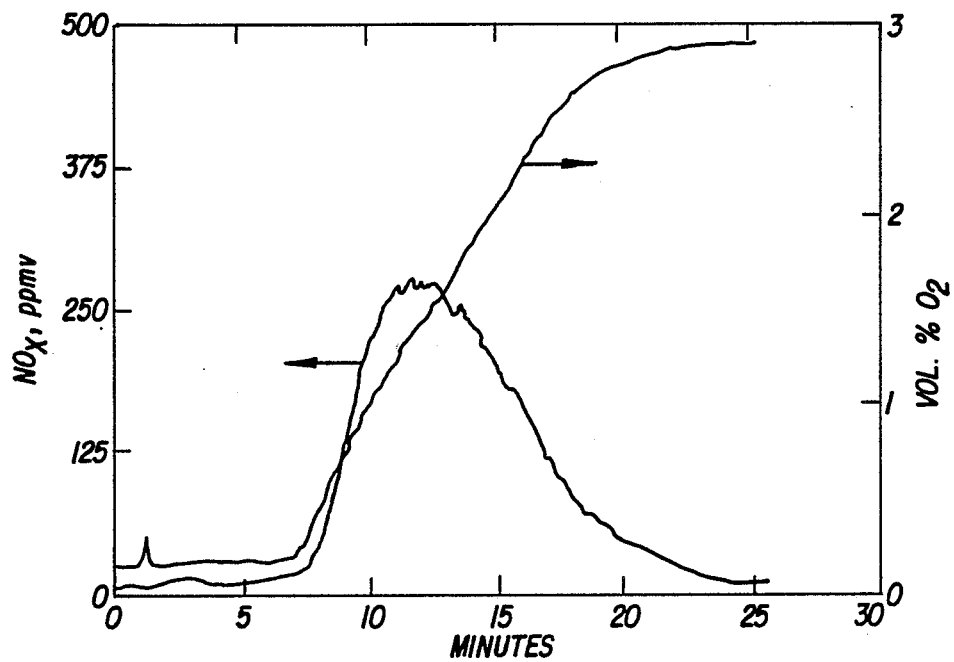
FIGS. 1A, 1B. Effluent Species Profiles, Regeneration of Coked FCC Catalyst Without Copper-Loaded Zeolite.

This invention provides a zeolitic copper composition having enhanced resistance to loss of catalytic activity on exposure to steam at high temperature, said composition comprising a copper-loaded crystalline zeolite characterized by a silica to alumina ratio of 20:1 to about 100:1, a pore size of about 5 to 13 Angstroms, and a copper content of at least 2 wt % to about 130 wt % of said zeolitic alumina, said copper-loaded zeolite being intimately associated with a steam stabilizing amount of an inorganic compound selected from the group consisting of titanium compounds, zirconium compounds and mixtures thereof. The preferred crystalline zeolites have the crystal structure of ZSM-5, ZSM-11, ZSM-12, ZSM-22, ZSM-23, ZSM-35, ZSM-38, ZSM-48, mordenite, dealuminated Y or Zeolite Beta. ZSM-5 is particularly preferred.

This invention also provides an improved method for preparing a zeolitic copper catalyst, the improvement comprising incorporating an inorganic titanium or zirconium compound in intimate association with the catalyst.

This invention also provides an improved method for catalytic abatement of pollution by an exhaust gas, by use of the novel zeolitic copper catalyst of this invention.

DETAILED DESCRIPTION AND PREFERRED EMBODIMENTS

The preferred highly siliceous zeolites useful in this invention include ZSM-5, ZSM-11, ZSM-12, ZSM-22, ZSM-23, ZSM-35, ZSM-38, ZSM 48, mordenite, dealuminated Y and Zeolite Beta, all of which are known.

U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-22 is more particularly described in U.S. Pat. No. 4,481,177, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

ZSM-48 is more particularly described in U.S. Pat. No. 4,397,827, the entire content of which is incorporated herein by reference.

Zeolite Beta is more particularly described in U.S. Pat. No. 3,308,069, the entire content of which is incorporated herein by reference.

For purposes of this invention, any of the preferred zeolites may be used as such as the starting material. Alternatively, the zeolites may be incorporated in a binder (matrix) such as silica alumina, alumina, other known inorganic binder, and used in this form as the starting material. Regardless of whether the zeolite is in pure form or incorporated in a matrix, it is preferred that it be in the hydrogen, ammonium, or sodium form prior to loading with metals as described hereinbelow.

Copper may be introduced into the zeolite by the use of any soluble copper salt, preferably one which provides cupric ions. We have found cupric acetate and cupric nitrate to be useful for purposes of this invention. Ion-exchange techniques, as shown in the examples, provide catalytically effective copper. However, as will be illustrated by example, effective loading is also obtained when the copper is introduced by impregnation of the zeolite with an aqueous solution of the copper salt.

Introduction of a steam stabilizing amount of titanium or zirconium or a mixture thereof is effected by treatment of the zeolite with any titanium or zirconium compound that can be brought into intimate association with the zeolite. We have found that highly effective results are obtained with the use of aqueous solutions of titanium tetramethoxide and zirconium acetate, and such materials being readily available, are preferred. As will be illustrated by example, the introduction of titanium or zirconium compound is effective when done by impregnation of the zeolite. The introduction of titanium or zirconium may follow ion-exchange by cupric ion, but it also may be done concurrently therewith with an aqueous solution containing, for example, both divalent copper cations and a soluble titanium or soluble zirconium compound. It is also contemplated to load the zeolite with titanium or zirconium compound prior to introduction of copper. An amount of the stabilizing metal equal to 1 to 20 wt % of the total catalyst is effective.

As a final step in preparation of the zeolitic copper catalyst of this invention, the dried catalyst is calcined in air for about 1–4 hours to decompose organic matter and fix the titanium and/or zirconium in the composition as an inorganic compound. Suitable calcination temperatures are 500° to about 600° C.

Regardless of the particular reagents used or method of loading the zeolite with copper and stabilizing metal, the amounts of reagents and the technique used should be adjusted to provide a zeolitic copper catalyst having in the dehydrated state the composition in terms of mole ratio of oxides:

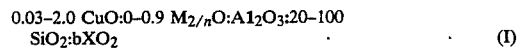
0.03–2.0 CuO:0–0.9 $M_{2/n}O$:$Al_2O_3$:20–100 $SiO_2$:$bXO_2$     (I)

wherein M is at least one cation other than a copper cation and having a valence of "n", and $bXO_2$ is a steam stabilizing amount of an inorganic titanium or zirconium compound or a mixture thereof, said crystalline zeolite preferably having the crystal structure of ZSM-5, ZSM-11, ZSM-12, ZSM-22, ZSM-23, ZSM-35, ZSM-38, ZSM-48, mordenite, dealuminated Y or Zeolite Beta.

One skilled in the art will recognize that the composition (I) includes amounts of copper that exceed the theoretical ion-exchange capacity of the zeolite. While not wishing to be bound by theory, it is contemplated that, even with a conventional ion-exchange procedure such as shown in Example 1, a portion of the copper introduced is fixed in some form other than as simple divalent cation electrostatically bonded to acidic alumina sites. The terms "zeolitic copper" and "copper-loaded zeolite" as used herein includes compositions described by (I) regardless whether or not the copper content exceeds the ion-exchange capacity of the zeolite. The manner in which the inorganic titanium or zirconium compound included in composition (I) functions to stabilize the catalytic activity of the copper is not understood. It is believed, however, that effective stabilization results from the intimate association of the copper-loaded zeolite with the inorganic titanium or zirconium compound.

The stabilized zeolitic copper catalyst of this invention is particularly useful as additive for the cracking catalyst used in the fluid catalytic cracking of gas oils, for example, to make gasoline and fuel oil. In such use, it serves to reduce emissions of $NO_x$ and/or CO from the regenerator of the fluid catalytic cracking unit. This use is more fully described in copending patent application Ser. No. 279,612 filed on even date herewith, the entire content of which is incorporated herein by reference as if fully set forth.

Other uses contemplated for composition (I) include any process of catalytically treating an exhaust gas to reduce emission of at least one pollutant including $NO_x$, CO and hydrocarbons wherein a zeolitic copper catalyst is effective. Such processes include automotive exhaust gas treatment, SCR treatment of exhaust gas from stationary power plants, and oxidation of CO, but are not limited to these.

EXAMPLES

The examples given below are not to be construed as limiting the scope of this invention, which scope is determined by this entire specification and the append claims.

EXAMPLE 1

Catalyst 1 (Cat. 1) was prepared by aqueous ion exchange of a silica-alumina bound ZSM-5 having a $SiO_2$/$Al_2O_3$ ratio of about 26:1. The bound ZSM-5 was obtained in a spray dried form, suitable for direct use in FCC applications, and consisted of 75% binder/25% ZSM-5. The exchange procedure was carried out at 85° C. using a 0.1 N copper acetate solution at a ratio of 1 g catalyst per 10 ml solution; the pH of the exchange solution was 5. After two hours with occasional stirring, the catalyst was filtered and thoroughly washed with distilled water. The exchange, filter, and wash procedure was repeated two additional times. The catalyst was then air-dried at 150° C. An elemental analysis showed 2.2 wt % Cu.

EXAMPLE 2

Catalyst 2 (Cat. 2) was prepared by treating Cat. 1 with an aqueous solution of zirconium acetate by the method of incipient wetness. The catalyst was then dried at 150° C. for 2 hours, followed by air calcination at 538° C. for 4 hours. An elemental analysis showed 2.2 wt % Cu and 12 wt % Zr.

EXAMPLE 3

Catalyst 3 (Cat. 3) was prepared by treating Cat. 1 with an acidified aqueous solution of titanium tetramethoxide by the method of incipient wetness. The additive was dried and calcined as for Cat. 2. An elemental analysis showed 2.2 wt % Cu and 8 wt % Ti.

EXAMPLE 4

Catalyst 4 (Cat. 4) was prepared by treating Cat. 1 with an aqueous co-solution of zirconium acetate and titanium tetramethoxide by the method of incipient wetness to give loadings of Zr and Ti of 5 and 7 wt %, respectively. The additive was dried and calcined as for Cat. 2.

EXAMPLE 5

Catalyst 5 (Cat. 5) was prepared by treating a spray dried, silica-alumina bound ZSM-5 material (that described as the precursor material in preparing Cat. 1) with an aqueous cosolution of both copper nitrate and titanium tetramethoxide by the method of incipient wetness. The additive was then dried and calcined as for Cat. 2. An elemental analysis showed 3.3 wt % Cu and 4.6 wt % Ti.

EXAMPLE 6

Catalyst 6 (Cat. 6) was prepared by treating a spray dried, silica-alumina binder (analogous to that used in the precursor material for Cat. 1 except that no ZSM-5 component was present) with an aqueous solution of copper nitrate by the method of incipient wetness, followed by treatment with an acidified aqueous solution of titanium tetramethoxide by the method of incipient wetness. The additive was dried and calcined as for Cat. 2. An elemental analysis showed 3.4 wt % Cu and 5.5 wt % Ti.

EXAMPLE 7

Figure 1B:
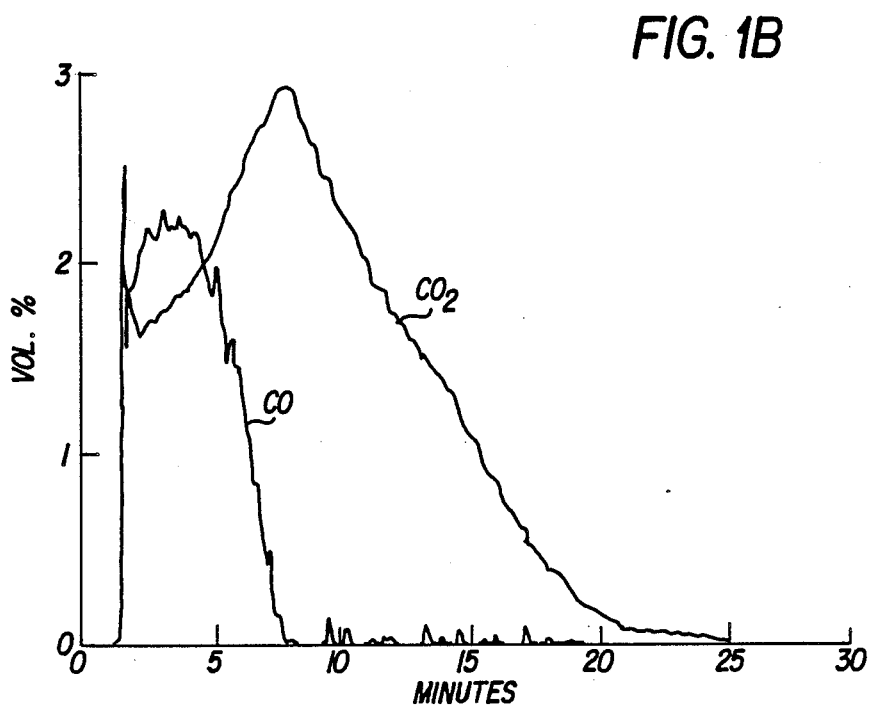

The $NO_x$ abatement performance of all the catalyst described in Examples 1-6 (Cat. 1-Cat. 6) was tested using a fluidized bed unit to simulate an FCC regenerator, which generates $NO_x$ during the regeneration of N-containing coked FCC catalyst. The test procedure was as follows: 0.5 g samples of Cat. 1-Cat. 6 were added to 10 g samples of coked commercial FCC catalyst (0.92% C, 265 ppm N) which contained 1.5 ppm Pt present as a commercial CO combustion promoter. Each coked FCC catalyst was regenerated in a semibatch mode in a fluidized bed unit at 700° C. using 400 cc/min. of a $N_2/O_2$ mixture to achieve a final $O_2$ concentration of 3 vol., %. Effluent $NO_x$ levels were continuously monitored using a chemiluminescent analyzer; the effluent stream was dried with a membrane drier prior to entering the analyzer. The peak in the effluent $NO_x$ emission was used to indicate the degree of $NO_x$ abatement achieved relative to the baseline case where no catalyst was added to the coked FCC catalyst bed. FIG. 1(A) and 1(B) of the drawing illustrates effluent species profiles for a control run (i.e. using only coked catalyst). As will be shown below, peak $NO_x$ emissions were found to be a good indicator of overall (integrated) $NO_x$ emissions.

Of particular significance is that all catalysts (Cat. 1-Cat. 6) were tested for $NO_x$ abatement performance both "fresh" and after a hydrothermal treatment. The hydrothermal treatment consisted of subjecting the catalysts to 100% steam at 760° C. for 4 hours and was used to simulate the type of aging that may occur under the conditions likely to be experienced in a combustion-related $NO_x$ cleanup application in the field. Hydrothermal aging is apt to be particularly troublesome when such catalysts must operate in the severe conditions of an FCC regenerator or in an automobile catalytic converter, for example.

Results of the tests for these catalysts are summarized in Table I and show the significant improvement in $NO_x$ abatement activity retention (after hydrothermal treatment) achieved upon incorporation of Ti and/or Zr into the catalysts containing Cu-ZSM-5 (Cat. 2-Cat. 5). Cat. 6, which contained no Cu-ZSM-5 component showed no $NO_x$ abatement activity when fresh and was not tested after steaming.

TABLE I

| Catalyst | Condition | Peak $NO_x$, ppm | Reduction % (P/I)* |
|---|---|---|---|
| None | — | 570 | — |
| Cat. 1 | Fresh | 69 | 88/86 |
| | Steamed | 585 | 0/0 |
| Cat. 2 | Fresh | 86 | 85/79 |
| | Steamed | 418 | 27/29 |
| Cat. 3 | Fresh | 102 | 82/77 |
| | Steamed | 406 | 29/27 |
| Cat. 4 | Fresh | 142 | 75/73 |
| | Steamed | 415 | 27/29 |
| Cat. 5 | Fresh | 194 | 66/63 |
| | Steamed | 392 | 31/34 |
| Cat. 6 | Fresh | 575 | 0/0 |
| | Steamed | (Not tested) | |

*P/I refer to peak and integrated $NO_x$ values, respectively.

Another, particularly preferred method for preparing the catalyst of this invention comprises intimately mixing, such as by extruding, the zeolite with titania binder, and impregnating the product with a solution of copper and cerium or copper and yttrium salts, followed by drying and calcining.

What is claimed is:

1. A zeolitic copper composition having enhanced resistance to loss of catalytic activity on exposure to steam at high temperature, said composition comprising a copper-loaded crystalline zeolite incorporated in a silica-alumina or an alumina binder, with said zeolite characterized by a silica to alumina ration of 20:1 to about 100:1, a pore size of about 5 to 13 Angstroms, and a copper content of at least 2 wt % to about 130 wt % of said zeolitic alumina, said copper-loaded zeolite being intimately associated with a steam stabilizing amount of an inorganic compound selected from the group consisting of titanium compounds, zirconium compounds and mixtures thereof.

2. The composition of claim 1 wherein said crystalline zeolite has the crystal structure of ZSM-5, ZSM-11, ZSM-12, ZSM-22, ZSM-23, ZSM-35, ZSM-38, ZSM-48, mordenite, dealuminated Y or Zeolite Beta.

3. The composition described in claim 2 wherein said crystalline zeolite has the structure of ZSM-5 and said copper-loaded zeolite is incorporated with a silica-alumina binder.

4. The composition described in claim 2 wherein said crystalline zeolite has the structure of ZSM-5 and said composition is coated on a monolith.

5. The composition described in claim 2 containing about 1 to 20 wt % of titanium or zirconium or mixture thereof.

6. The composition described in claim 3 containing about 1 to 20 wt % of titanium or zirconium or mixture thereof.

7. The composition described in claim 4 containing about 1 to 20 wt % of titanium or zirconium or mixture thereof.

8. A zeolitic copper catalyst having enhanced resistance to loss of activity on exposure to steam at high temperature, said catalyst comprising a crystalline zeolite incorporated in a silica-alumina or an alumina binder, with said zeolite having in the dehydrated state the composition in terms of mole ratio of oxides:

$$0.03-2.0\ CuO{:}0-0.9\ M_{2/n}O{:}Al_2O_3{:}20-100$$
$$SiO_2{:}bXO_2$$

wherein M is at least one cation other than a copper cation and having a valence of "n", and $bXO_2$ is a steam stabilizing amount of an inorganic titanium or zirconium compound or a mixture thereof, said crystalline zeolite having the crystal structure of ZSM-5, ZSM-11, ZSM-12, ZSM-22, ZSM-23, ZSM-35, ZSM-38, ZSM-48, mordenite, dealuminated Y or Zeolite Beta.

9. The composition described in claim 8 wherein said zeolite has the crystal structure of ZSM-5.

10. In a method for preparing a zeolitic copper catalyst incorporated in a silica-alumina or an alumina binder, which method comprises contacting a crystalline zeolite having the crystal structure of ZSM-5 and a silica to alumina ratio of 20:1 to about 100:1 with an aqueous solution of divalent copper cations under conditions effective to exchange at least 50 percent of the framework alumina tetrahedra with said copper-containing cation, and drying said copper exchanged zeolite, the improvement which comprises:

impregnating said zeolite with a stream-stabilizing amount of a soluble titanium or soluble zirconium compound; and, calcining said composition.

11. The improved method described in claim 10 wherein said step of contacting said zeolite with divalent copper cations precedes said step of impregnation with a soluble titanium or soluble zirconium compound.

12. The improved method described in claim 10 wherein said zeolite is impregnated with an aqueous solution containing both said divalent copper cations and said steam stabilizing amount of soluble titanium or soluble zirconium compound.

13. The method of claim 10 wherein said aqueous solution is a solution of cupric acetate or cupric nitrate and said soluble titanium or zirconium compound is provided by titanium tetramethoxide or zirconium acetate.

14. The method of claim 12 wherein said aqueous solution is a solution of cupric acetate or cupric nitrate and said soluble titanium or zirconium compound is provided by titanium tetramethoxide or zirconium acetate.

* * * * *